Patented Oct. 7, 1952

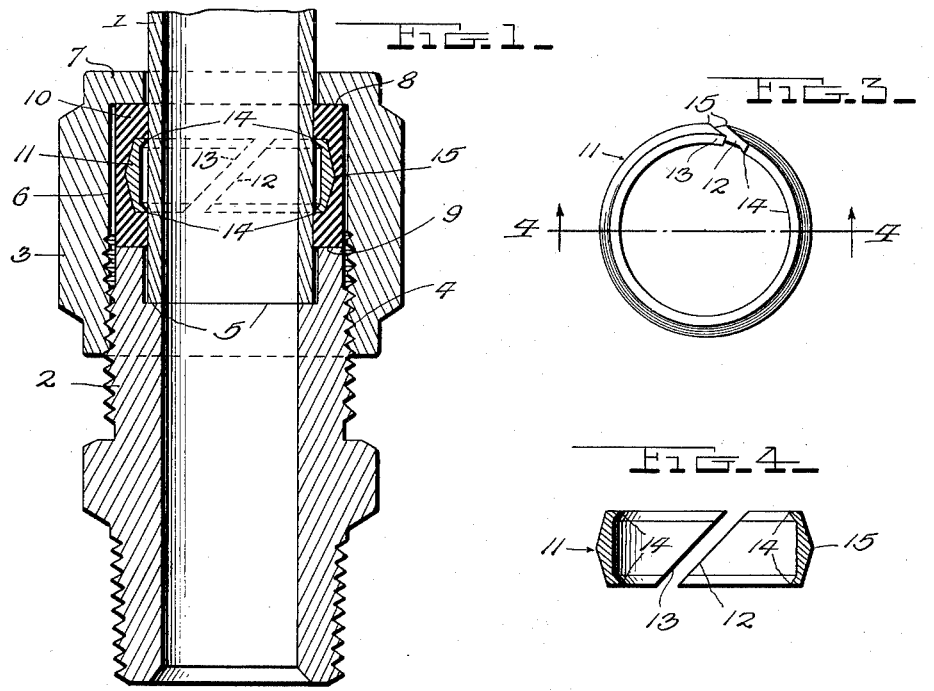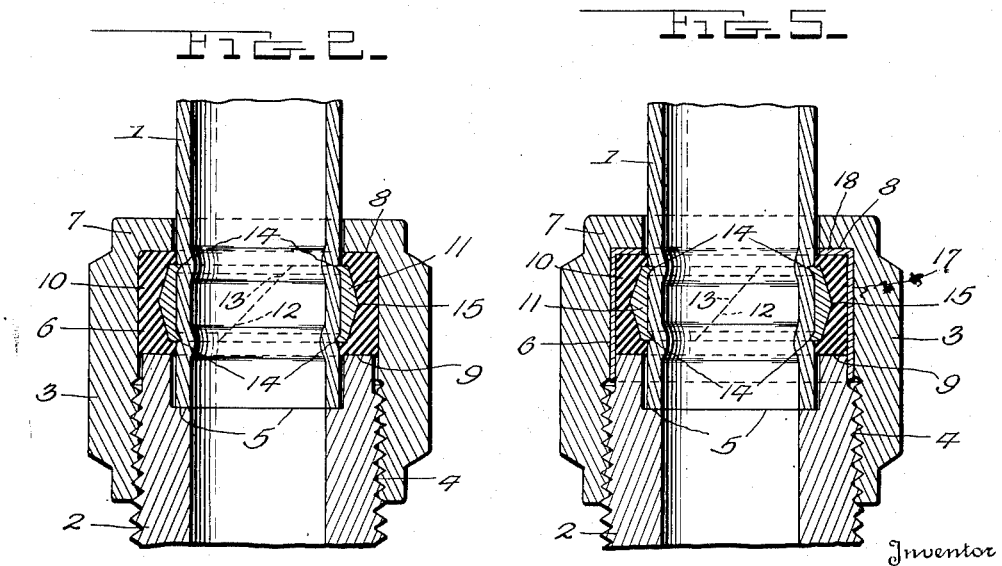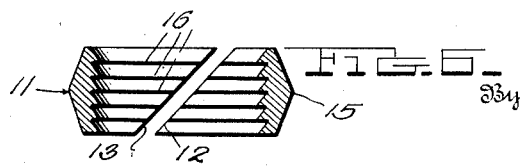

2,613,086

UNITED STATES PATENT OFFICE 2,613,086

COUPLING FOR FLARELESS TUBES

John N. Wolfram, Cleveland, Ohio, assignor to The Parker Appliance Company, Cleveland, Ohio, a corporation of Ohio Application March 29, 1944, Serial No. 528,582

11 Claims. (Cl. 285—90)

The invention relates to new and useful improvements in a coupling for flareless tubes.

An object of the invention is to provide a coupling for a flareless tube wherein the tube is firmly gripped and held from endwise movement in the coupling by a means which cushions vibrations in the tube but which does not rigidly restrain the vibrations.

A further object of the invention is to provide a means wherein the gripping connection between the coupling and the tube is accomplished solely by a deformable material.

A still further object of the invention is to provide a coupling for tubes wherein a metal gripping ring is contracted into holding engagement with the tube solely by the deforming of a non-metallic sleeve disposed between said ring and the coupling members.

A still further object of the invention is to provide a coupling of the above type wherein the ring for gripping the tube is split and is initially of a diameter slightly larger than the tube, which ring is contracted by the deformable material into tight gripping contact with the tube when the coupling is closed.

A still further object of the invention is to provide a coupling of the above type wherein the ring is provided with cutting edges that bite into the tube and positively hold it from endwise movement in the coupling.

In the drawings,

Figure 1 is a view in longitudinal section showing a coupling embodying the improvements with the members connected and a tube inserted preparatory to the closing of the coupling and the gripping of the tube;

Figure 2 is a view similar to Figure 1 but showing the coupling closed and the tube gripped;

Figure 3 is a side view of the split ring forming a part of the improved coupling;

Figure 4 is a sectional view on the line 4—4 of Figure 3;

Figure 5 is a view similar to Figure 2 but showing a slightly modified form of construction; and Figure 6 is a view similar to Figure 4 but showing a slightly modified form of gripping means on the split ring.

The invention has to do with a coupling for tubes and more particularly a tube which is flareless and without any laterally projecting parts. Such a tube is illustrated at 1 in the drawings. The coupling includes a male coupling member 2 and a female coupling member 3 which are provided with a threaded connection indicated at 4 in the drawings. The male coupling member is provided with a stop shoulder 5 against which the end of the tube 1 is placed, and this serves as a means for locating the tube in the coupling. The coupling member 3 is dimensioned at its inner face so that it is spaced away from the tube and provides a recess indicated at 6 in the drawings. The outer end of the coupling 3 has an inwardly projecting flange 7 which provides an abutment wall 8. The male coupling member 2 has an opposed abutment wall 9. These abutment walls 8 and 9 are the end walls of the recess 6 and of course when the coupling member is closed, the end wall 8 will have a relative movement toward the abutment wall 9.

Disposed within this recess in the coupling members is a sleeve 10 of a non-compressible deformable material, preferably rubber. This sleeve is dimensioned so that it is initially slightly out of contact with the surrounding wall of the coupling member 3. When the coupling is closed by turning the female member onto the male member, the sleeve will be compressed between the abutment walls 8 and 9 and deformed so as to contact with the surrounding cylindrical wall of the coupling member and also with the tube.

Disposed within this deformable sleeve 10 is a split ring 11. The ends of the ring, indicated at 12 and 13, are so shaped that they lie in lines which are parallel and which are inclined to the end planes of the ring. These ends are normally separated slightly from each other. At each side of the ring as shown in Figure 4, there are cutting edges 14, 14. The outer face of the ring has a maximum diameter at the center plane thereof indicated at 15, and the ring tapers inwardly at each side thereof. This ring is located within the sleeve 10 and, in fact, is embedded in the sleeve so that the cutting edges 14, 14 are initially substantially flush with the inner surface of the sleeve. The ring is placed in the sleeve and then the sleeve is placed on the tube. Before the sleeve is placed on the tube the coupling member 3 is placed on the tube. Then the tube and coupling members are brought into assembled relation with the male coupling member 2 and the members are connected.

When the member 3 is turned onto the member 2 the abutment walls 8 and 9 will move toward each other and this will compress the deformable sleeve which, in turn, will contract the ring, causing the cutting edges 14, 14 to bite into the tube as shown in Figure 2 of the drawing. The ring is disposed between the ends of the sleeve and the sleeve will contact with the tube at both the inner and outer ends of the ring. The ring firmly grips the tube and holds it against any endwise movement in the coupling. The deformable material completes the seal. The couplings 2 and 3 are so dimensioned that they are out of contact with the tube except at the stop shoulder 5 which locates the tube. In other words, the coupling members have no lateral gripping contact with the tube. The sole lateral gripping contact of the tube is with the split ring and the deformable sleeve. The split ring, being embedded in the deformable sleeve, does not contact with the coupling members.

Inasmuch as the sole connection between the tube and the coupling is eventually through the deformable sleeve, this provides a very effective means for resisting vibrations in the tube. In other words, the vibrations in the tube are cushioned by this deformable sleeve. It will be noted that there is only a slight clearance between the flange 7 of the coupling member 3 and the tube. With this small clearance the vibrations will be absorbed and at the same time extrusion of the deformable member between the tube and the coupling is avoided. If the coupling is used for resisting vibrations of large amplitude, then this clearance would be increased.

In Figure 6 of the drawing the ring 11 is of the same general structure as the ring shown in Figure 4 except that the inner face of the ring is provided with a series of spaced cutting edges 16 extending all the way across the inner face of the ring. In Figure 5 of the drawings the coupling is of the same structure as shown and described in connection with Figures 1 and 2. The only difference is that a metal sleeve 17 is placed within the female coupling 3 between the deformable sleeve 10 and the inner wall of the coupling which surrounds the same. This metal sleeve 17 has a flange 18 at its outer end which lies between the abutment wall 8 and the deformable sleeve 10. When this metal sleeve 17 is placed in the coupling, the coupling member is free to turn on the sleeve and this reduces the tendency of the tube to rotate with the nut or coupling member 3.

It is obvious that many changes in the details of construction may be made without departing from the spirit of the invention as set forth in the appended claims.

I claim:

1. A coupling for flareless tubes comprising coupling members having a threaded connection, said members having opposed end walls and being shaped so as to provide an inner recess disposed for surrounding a tube inserted in the coupling and a sleeve of non-compressible deformable material disposed in said recess and surrounding the tube, said sleeve being dimensioned so as to be deformed by the coupling members into pressure gripping engagement with the tube as said coupling members are moved relatively to bring said end walls closer together, and a split metal ring located within said sleeve between the ends thereof with a portion of the sleeve disposed for sealing engagement with the tube endwise of the ring at each end thereof, said ring having on the inner face thereof sharp cutting edges adapted to bite into the wall of the tube when said ring is contracted into engagement therewith by the deforming of said sleeve.

2. A coupling for flareless tubes comprising coupling members having a threaded connection, said members having opposed end walls and being shaped so as to provide an inner recess disposed for surrounding a tube inserted in the coupling and a sleeve of non-compressible deformable material disposed in said recess and surrounding the tube, said sleeve being dimensioned so as to be deformed by the coupling members into pressure gripping engagement with the tube as said coupling members are moved relatively to bring said end walls closer together, and a split metal ring located within said sleeve between the ends thereof with a portion of the sleeve disposed for sealing engagement with the tube endwise of the ring at each end thereof, the ends of which are disposed at an inclination to the end planes of the ring and initially separated, said ring having on its inner face cutting edges adapted to bite into the tube when said ring is contracted into engagement therewith by the deforming of said sleeve.

3. A coupling for flareless tubes comprising coupling members having a threaded connection, said members having opposed end walls and being shaped so as to provide an inner recess disposed for surrounding a tube inserted in the coupling and a sleeve of non-compressible deformable material disposed in said recess and surrounding the tube, said sleeve being dimensioned so as to be deformed by the coupling members into pressure gripping engagement with the tube as said coupling members are moved relatively to bring said end walls closer together, and a split metal ring located within said sleeve between the ends thereof with a portion of the sleeve disposed for sealing engagement with the tube endwise of the ring at each end thereof and having the ends thereof normally spaced, said ring having at each side face thereof an inwardly projecting cutting edge adapted to bite into the tube when said ring is contracted into engagement therewith by the deforming of said sleeve.

4. A coupling for flareless tubes comprising a male coupling member having a stop shoulder for positioning a tube in the coupling and an abutment wall, a female coupling member having threaded engagement with said male coupling member, said female coupling member being spaced away from the tube so as to provide a recess and having at its outer end an inwardly projecting flange forming an abutment wall opposed to the abutment wall on the male coupling member, a sleeve of non-compressible deformable material disposed in said recess and dimensioned so as to be deformed by the coupling members into pressure gripping engagement with the tube, a split metal ring having the ends thereof initially separated, located within said sleeve between the ends thereof, said ring being contracted when said sleeve is deformed into firm gripping contact with said tube, said ring having on the inner face thereof sharp cutting edges adapted to bit into the wall of the tube when said ring is contracted into engagement therewith by the deformable sleeve, said coupling members being dimensioned so as to be out of contact with the tube except at the stop shoulder, and a metal sleeve disposed in said female member between the deformable sleeve and the coupling member and having an inwardly projecting flange disposed between the deformable sleeve and the abutment on the female coupling.

5. A coupling for flareless tubes comprising a male coupling member having a stop shoulder for positioning a tube in the coupling and an abutment wall, a female coupling member having threaded engagement with said male coupling member, said female coupling member being spaced away from the tube so as to provide a generally cylindriform annular recess having at its outer end an inwardly projecting flange forming a transverse abutment wall opposed to the transverse abutment wall on the male coupling member, a generally cylindriform sleeve of noncompressible deformable material disposed in and substantially filling said annular recess and having an annular clearance in its inner face intermediate the ends thereof, a heavy split metal ring mounted in the sleeve clearance and having an inner face paralleling the external surface of the tube and terminating at each end in an inwardly projecting cutting edge, whereby upon threading together of the male and female members the sleeve will be deformed endwise in a manner for having its end portions engage in sealing contact against the tube endwise of the ring and for causing the inner face of said ring to be pressed against the tube and said cutting edges to become deeply embedded in the external surface of said tube.

6. A coupling as defined in claim 5 in which the external surface of the heavy split ring is provided with a central annular enlargement and tapers toward each end from said enlargement.

7. In securing means for tubing, a pressure housing adapted to receive an end of a tube to be secured, said housing including a plurality of relatively movable members defining, with the tube, a pressure space, one of said members being apertured to permit the penetration of the tube into the pressure space, said securing means comprising a contractable inwardly concaved split anchor ring manually slidable on the tube, the edges of said ring being adapted, when pressure is applied, to bite into the surface of said tube, and a sealing mass of yielding, elastic material adapted to be disposed about said anchoring ring and substantially filling said pressure space, whereby, when the relatively movable members are moved to decrease the pressure space, pressure is applied to the sealing mass for forcing the edges of the anchor ring into biting contact with the wall of the tube.

8. In securing means for tubing, a pressure housing adapted to receive an end of a tube to be secured, said housing including a plurality of relatively movable members defining, with the tube, a pressure space, one of said members being apertured to permit the penetration of the tube into the pressure space, said securing means comprising a contractable inwardly concaved split anchor ring manually slidable on the tube, the edges of said ring being adapted, when pressure is applied, to bite into the surface of said tube, and a sealing mass of yielding, elastic material adapted to be disposed about said anchoring ring and said tube and substantially filling said pressure space, whereby, when the relatively movable members are moved to decrease the pressure space, pressure is applied to the sealing mass for forcing the edges of the anchor ring into biting contact with the wall of the tube, and for sealing the tube at opposite ends of said anchor ring.

9. In securing means for tubing, a pressure housing adapted to receive an end of a tube to be secured, said housing including a plurality of relatively movable members defining, with the tube, a pressure space, one of said members being apertured to permit the penetration of the tube into the pressure space, said securing means comprising a contractable inwardly concaved split anchor ring the edges of which are adapted, when pressure is applied, to bite into the surface of said tube, and a sealing sleeve of yielding, elastic material preformed with an interior annular recess for said anchor ring and manually slidable with said ring on said tube, said sealing sleeve substantially filling said pressure space, whereby, when the relatively movable members are moved to decrease the pressure space, pressure is applied to the sealing sleeve for forcing the edges of the anchor ring into biting contact with the wall of the tube, and for sealing the tube at opposite ends of said anchor ring.

10. In securing means for tubing, a pressure housing adapted to receive an end of a tube to be secured, said housing including a plurality of relatively movable members defining, with the tube, a pressure space, one of said members being apertured to permit the penetration of the tube into the pressure space, said securing means comprising a contractable split anchor ring manually slidable on the tube, said ring having at at least one end thereof an inwardly directed edge portion being adapted, when pressure is applied, to bite into the surface of said tube, and a sealing mass of yielding, elastic material adapted to be disposed about said anchoring ring and substantially filling said pressure space, whereby, when the relatively movable members are moved to decrease the pressure space, pressure is applied to the sealing mass for forcing said edge portion of the anchor ring into biting contact with the wall of the tube.

11. In securing means for tubing, a pressure housing adapted to receive an end of a tube to be secured, said housing including a plurality of relatively movable members defining, with the tube, a pressure space, one of said members being apertured to permit the penetration of the tube into the pressure space, said securing means comprising a contractable split anchor ring manually slidable on the tube, said ring having multiple inwardly projecting teeth extending across the full width of the inner face of the ring which is slidable on the tube and being adapted, when pressure is applied, to bite into the surface of said tube, and a sealing mass of yielding, elastic material adapted to be disposed about said anchoring ring and substantially filling said pressure space, whereby, when the relatively movable members are moved to decrease the pressure space, pressure is applied to the sealing mass for forcing said multiple inwardly extending teeth of the anchor ring into biting contact with the wall of the tube.

JOHN N. WOLFRAM.

REFERENCES CITED

The following references are of record in the file of this patent:

UNITED STATES PATENTS

| Number | Name | Date |
| --- | --- | --- |
| 2,021,745 | Pfefferle et al. | Nov. 19, 1935 |
| 2,179,127 | Lauer | Nov. 7, 1939 |
| 2,211,856 | Kreidel | Aug. 20, 1940 |
| 2,232,513 | Confer | Feb. 18, 1941 |
| 2,255,673 | McDermott | Sept. 9, 1941 |
| 2,344,698 | Howe | Mar. 21, 1944 |

FOREIGN PATENTS

| Number | Country | Date |
| --- | --- | --- |
| 379,413 | Great Britain | Sept. 1, 1932 |